US012802472B2

(12) United States Patent
Zhao et al.

(10) Patent No.: US 12,802,472 B2
(45) Date of Patent: Nov. 17, 2026

(54) ZERO-SHOT OPEN-VOCABULARY 3D AUTO-LABELING USING VISUAL FOUNDATION MODELS

(71) Applicant: Robert Bosch GmbH, Stuttgart (DE)

(72) Inventors: Cheng Zhao, Milpitas, CA (US); Ruoyu Wang, Sunnyvale, CA (US); Yuliang Guo, Redwood City, CA (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 18/731,578

(22) Filed: Jun. 3, 2024

(65) Prior Publication Data

US 2025/0371893 A1 Dec. 4, 2025

(51) Int. Cl.

| | |
|---|---|
| ***G06V 20/70*** | (2022.01) |
| ***G01S 7/4865*** | (2020.01) |
| ***G01S 17/894*** | (2020.01) |
| ***G06F 40/30*** | (2020.01) |
| ***G06V 10/26*** | (2022.01) |
| ***G06V 10/50*** | (2022.01) |
| ***G06V 10/62*** | (2022.01) |
| ***G06V 10/762*** | (2022.01) |
| ***G06V 10/764*** | (2022.01) |

(Continued)

(52) U.S. Cl.

CPC ............ *G06V 20/70* (2022.01); *G01S 7/4865* (2013.01); *G01S 17/894* (2020.01); *G06F 40/30* (2020.01); *G06V 10/26* (2022.01); *G06V 10/50* (2022.01); *G06V 10/62* (2022.01); *G06V 10/762* (2022.01); *G06V 10/764* (2022.01); *G06V 10/774* (2022.01); *G06V 10/82* (2022.01); *G06V 20/56* (2022.01); *G06V 20/64* (2022.01)

(58) Field of Classification Search

None

See application file for complete search history.

(56) References Cited

U.S. PATENT DOCUMENTS

2021/0370968 A1* 12/2021 Xiao .................. G01C 21/3848
2025/0299463 A1* 9/2025 Shin ........................ G06V 10/82

(Continued)

OTHER PUBLICATIONS

Kirillov et al., "Segment Anything", Meta AI Research, FAIR, 2023, p. 1-30.

(Continued)

*Primary Examiner* — Darryl V Dottin

(74) *Attorney, Agent, or Firm* — BROOKS KUSHMAN P.C.

(57) ABSTRACT

Zero-shot open-vocabulary 3D auto-labeling is performed using visual foundation models (VFMs). Multi-view 2D images of an environment and corresponding 3D LiDAR points of the environment are received. 2D semantic knowledge is extracted from the multi-view 2D images in close-set and open-set detection branches. 3D spatial-temporal prompts are generated via clustering and tracking of the 3D LiDAR points. The 3D spatial-temporal prompts and the 2D semantic knowledge are used for mapping the 2D semantic knowledge to a plurality of clusters of the 3D LiDAR points, thereby producing labeled 3D LiDAR points defining a 3D semantic segmentation of the 3D LiDAR points. One or more downstream applications are performed using the labeled 3D LiDAR points.

22 Claims, 8 Drawing Sheets

(51) Int. Cl.

| | |
|---|---|
| ***G06V 10/774*** | (2022.01) |
| ***G06V 10/82*** | (2022.01) |
| ***G06V 20/56*** | (2022.01) |
| ***G06V 20/64*** | (2022.01) |

(56) References Cited

U.S. PATENT DOCUMENTS

2025/0363776 A1* 11/2025 Sriram ................. G06V 10/764
2025/0371893 A1* 12/2025 Zhao ...................... G06V 10/82

OTHER PUBLICATIONS

Liu et al., "Grounding DINO: Marrying DINO with Grounded Pre-Training for Open-Set Object Detection", arXiv preprint arXiv:2303.05499, 2023, p. 1-17.

Zou et al., "Segment Everything Everywhere All at Once", arXiv preprint arXiv:2304.06718, 2023, p. 1-13.

Mei et al., "Vocabulary-Free 3D Instance Segmentation with Vision and Language Assistant", arxiv.org, Cornell University Library, Aug. 20, 2024, 14 pages.

Zhou et al., "OpenAnnotate3D: Open-Vocabulary Auto-Labeling System for Multi-Modal 3D Data", 2024 IEEE International Conference on Robotics and Automation (ICRA), May 13-17, 2024, 7 pages.

* cited by examiner

400A

400B

600

ZERO-SHOT OPEN-VOCABULARY 3D AUTO-LABELING USING VISUAL FOUNDATION MODELS

TECHNICAL FIELD

Aspects of the disclosure generally relate to zero-shot and open-vocabulary 3D auto-labeling using visual foundation models.

BACKGROUND

Auto-labeling for self-driving car data is a crucial aspect of training autonomous vehicle (AV) systems, e.g., perception and planning system. Since self-driving cars rely heavily on machine learning models, massive amounts of annotated data are required to train and validate these models. Manually labeling this data is a time-consuming and costly process. Auto-labeling techniques aim to reduce the human effort involved and improve the efficiency of the data labeling process.

SUMMARY

In one or more illustrative examples, a method for zero-shot open-vocabulary 3D auto-labeling using visual foundation models (VFMs) is provided. Multi-view 2D images of an environment and corresponding 3D LiDAR points of the environment are received. 2D semantic knowledge is extracted from the multi-view 2D images in close-set and open-set detection branches. 3D spatial-temporal prompts are generated via clustering and tracking of the 3D LiDAR points. The 3D spatial-temporal prompts and the 2D semantic knowledge are used for mapping the 2D semantic knowledge to a plurality of clusters of the 3D LiDAR points, thereby producing labeled 3D LiDAR points defining a 3D semantic segmentation of the 3D LiDAR points. One or more downstream applications are performed using the labeled 3D LiDAR points.

In one or more illustrative examples, a system for zero-shot open-vocabulary 3D auto-labeling using visual foundation models (VFMs), includes 2D camera sensors configured to capture multi-view 2D images; 3D LiDAR sensors configured to capture 3D LiDAR points, the 3D LiDAR points corresponding to the multi-view 2D images; and one or more computing devices configured to receive the multi-view 2D images of an environment and the 3D LiDAR points of the environment, extract 2D semantic knowledge from the multi-view 2D images in close-set and open-set detection branches, generate 3D spatial-temporal prompts via clustering and tracking of the 3D LiDAR points, use the 3D spatial-temporal prompts and the 2D semantic knowledge for mapping the 2D semantic knowledge to a plurality of clusters of the 3D LiDAR points, thereby producing labeled 3D LiDAR points defining a 3D semantic segmentation of the 3D LiDAR points, and perform one or more downstream applications using the labeled 3D LiDAR points.

In one or more illustrative examples, a non-transitory computer-readable medium includes instructions for zero-shot open-vocabulary 3D auto-labeling using visual foundation models (VFMs) that, when executed by one or more computing devices, cause the one or more computing devices to perform operations including to receive multi-view 2D images of an environment from 2D camera sensors; receive 3D LiDAR points of the environment from 3D LiDAR sensors; extract 2D semantic knowledge from the multi-view 2D images in close-set and open-set detection branches, including in the open-set detection branch, using a 2D vision-language VFM to obtain 2D bounding boxes of long-tail objects and using a 2D image segmentation model, receiving the 2D bounding boxes as prompts to determine pixel-level labels of the detected long-tail objects, and in the close-set detection branch, extracting pixel-level labels of normal classes using a transformer-style semantic segmentation network trained for identifying the normal classes in captured data, and using the segmentation model to determine pixel-level labels of the detected normal objects; generate 3D spatial-temporal prompts via clustering and tracking of the 3D LiDAR points; use the 3D spatial-temporal prompts and the 2D semantic knowledge for mapping the 2D semantic knowledge to a plurality of clusters of the 3D LiDAR points, thereby producing labeled 3D LiDAR points defining a 3D semantic segmentation of the 3D LiDAR points; and perform one or more downstream applications using the labeled 3D LiDAR points.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

3D auto-labeling refers to the use of algorithms and tools to automatically or semi-automatically label data, rather than relying solely on human annotators. The objective is to accelerate the labeling process and reduce costs, while maintaining or even improving accuracy. Most existing methods attempted to address this challenge by leveraging transfer learning from pretrained neural networks or by creating synthetic data from urban simulations. Most recently, a technique wave of vision foundation models, e.g., the Segment Anything Model (SAM) approach and the Segment Everything Everywhere Model (SEEM) has emerged to facilitate the pixel-level labeling on the 2D data. However, limited methods explore the visual foundation models (VFMs) on voxel-level labeling of the 3D data. Yet, there is potential in adapting or expanding these 2D VFMs for 3D vision challenges, especially on the 3D auto-labeling task.

A zero-shot and open-vocabulary 3D auto-labeling system may be built upon 2D VFMs. This system proficiently achieves dense 3D semantic segmentation on 3D LiDAR point clouds. This may be useful, for example, within the realms of autonomous driving and parking scenarios. A main aspect of the approach includes leveraging the spatial-temporal 3D geometry clues from lidar as prompts to retrieve the VFM-based semantic information from RGB images.

The approach may be distinguished by three primary aspects: i) a dual-branch 2D semantic segmentation is utilized that incorporates both closet-set and open-set segmentation facilitated by VFMs, ii) a 3D spatial-temporal geometry prompts generation is performed through adaptive Euclidean clustering and Extended Kalman Filter (EKF) tracking, and iii) that the approach is a zero-shot solution without any training steps. The approach is described, and qualitative and quantitative results are provided on public datasets for illustration.

Figure 1:
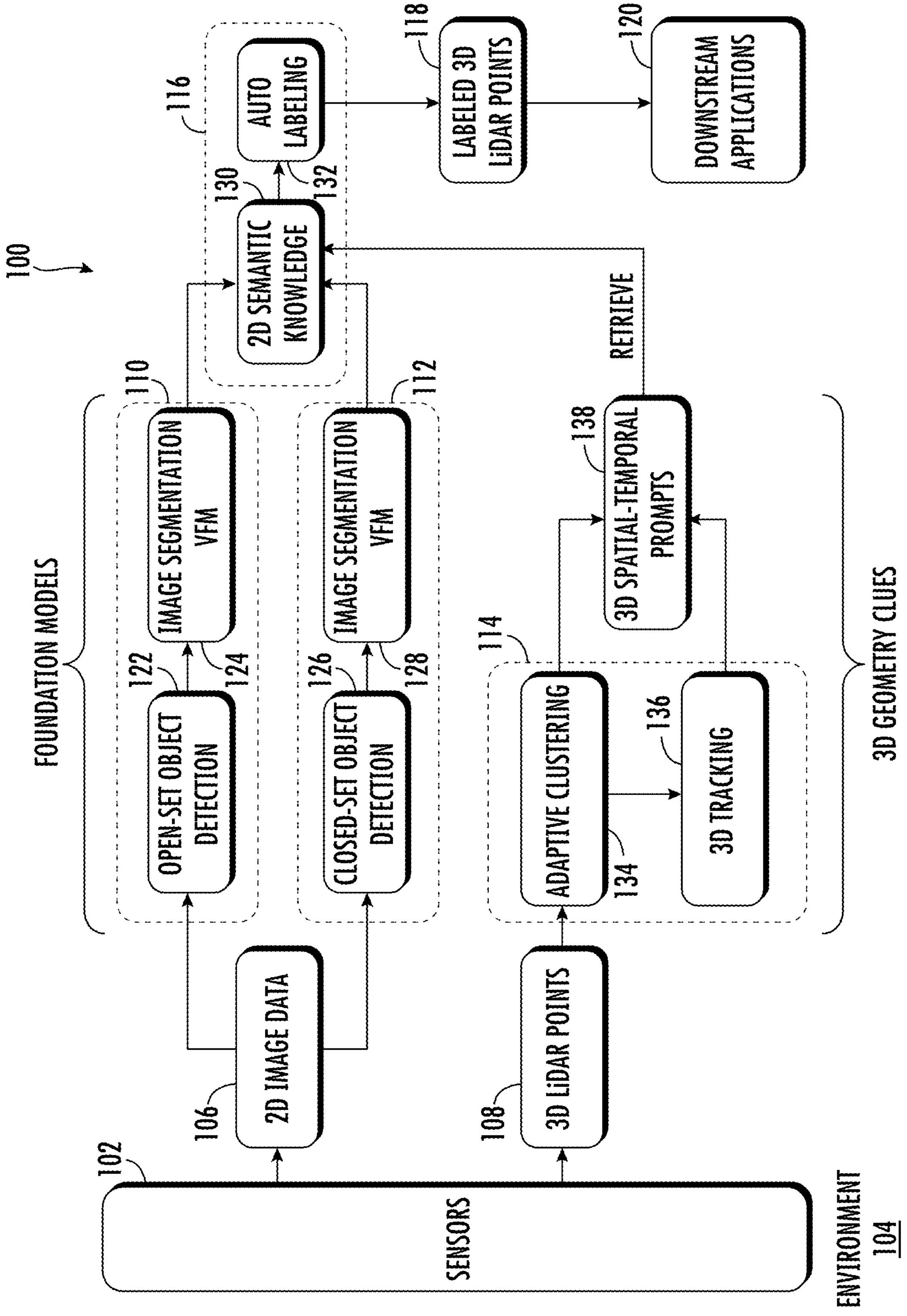
FIG. 1 illustrates an example system for operation of the zero-shot and open-vocabulary 3D auto-labeling approach.

FIG. 1 illustrates an example system 100 for operation of the zero-shot and open-vocabulary 3D auto-labeling approach. As shown, the system 100 is configured to receive, from sensors 102 in an environment 104, a sequence of multi-view 2D images 106 and 3D LiDAR points 108 as inputs. The system 100 includes three primary aspects: i) a dual-branch 2D semantic segmentation using an open-set detection branch 110 and a closed-set detection branch 112; ii) 3D spatial-temporal geometry prompt generation 114; and iii) 2D-3D label retrieval 116. The system 100 is further configured to deliver pixel-level 2D semantic segmentation for the images and voxel-level 3D semantic segmentation as labeled 3D LiDAR points 118 as outputs. These outputs may be employed for various downstream applications 120 for various uses.

The open-set detection branch 110 and the closed-set detection branch 112 are shows as parallel paths of the dual-branch 2D semantic segmentation, although these operations could be performed sequentially, simultaneously, or in any ordering. The open-set detection branch 110 of the dual-branch 2D semantic segmentation includes an open-set object detection 122 followed by use of an image segmentation VFM 124. The closed-set detection branch 112 of the dual-branch 2D semantic segmentation includes a closed-set object detection 126 followed by another use of the same or a different image segmentation VFM 128. The results of the dual-branch 2D semantic segmentation are 2D semantic knowledge 130, which is provided to the 2D-3D label retrieval 116.

The 3D spatial-temporal geometry prompt generation 114 performs adaptive clustering 134 and 3D tracking 136, which results in the generation of 3D spatial-temporal prompts 138. These 3D spatial-temporal prompts 138 may be geometry prompts that are also provided to the 2D-3D label retrieval 116 as a prompt for auto labeling 132 using the 2D semantic knowledge 130. The auto labeling 132 results in the labeled 3D LiDAR points 118, which as noted may be provided to the downstream applications 120 for various uses.

It should be noted that while the system 100 for operation of the zero-shot and open-vocabulary 3D auto-labeling approach is shown, variations on the system 100 are possible. In an example, one or more of the components of the system 100 may be combined, separated, and/or operated at different times or in different orderings than as shown.

The sensors 102 may include various devices configured to generate signals based on visual aspects of the environment 104. As discussed herein, the sensors 102 may include 2D sensors such as cameras. The 2D sensors may be configured to operate at various resolutions (e.g., standard definition (SD), high definition (HD), full-HD, ultra-high definition (UHD), 4K, etc.), dynamic range (8 bits, 10 bits, or 12 bits per pixel per color, etc.), and frequencies and count of color channels (e.g., infrared, red-green-blue (RGB), black & white, etc.). Also discussed herein, the sensors 102 may include 3D sensors such as LiDAR sensors 102. The LiDAR sensors 102 may be configured to generate a point cloud of individual distance points. These points are detected the LiDAR scanner transmitting brief pulses of light, which are reflected off various objects back to the LiDAR sensor 102. The travel times of these returning pulses are used to calculate the distance between the LiDAR sensor 102 and the object.

The multi-view 2D images 106 refer to image data captured by a 2D imaging sensor 102. The image data may include an array of pixels, where each pixel represents aspects of a 2D image at that location. The multi-view 2D images 106 may be captured at various resolutions, dynamic range, and frequencies and count of color channels, based on the sensors 102 that are used as well as settings of the image capture. In an example, the multi-view 2D images 106 may be captured using one or more camera devices, for example by an array of camera sensors 102 mounted around a vehicle to capture a 360-degree field of view around the vehicle. It should be noted that this is only one example and multi-view 2D images 106 from other a domain-specific environments 104 are contemplated.

The 3D LiDAR points 108 refer to the point cloud of individual distances that are reflected to the LiDAR sensor 102, responsive to a LiDAR scanner transmitting brief pulses of light. The 3D LiDAR points 108 may be captured at substantially the same time and location as the capture of the multi-view 2D images 106, such that the 3D LiDAR points 108 and the multi-view 2D images 106 provide two different imaging modalities of the same environment 104. Continuing with the vehicle example, the 3D LiDAR points 108 may be captured using one or more LiDAR sensors 102 of a vehicle, although other domain-specific environments 104 are contemplated.

The dual-branch close-open set for 2D semantic segmentation may be used to perform 2D segmentation of the multi-view 2D images 106. In the system 100, objects requiring labeling are categorized into two groups: long-tail objects, and normal objects. The so-called normal objects are object classes that are relatively more commonly labeled in the dataset, such as cars, trees, and pedestrians in a vehicle example. The long-tail objects are objects classes that are relatively rarely labeled, such as excavators, security bars, and ground locks in a vehicle example. In a possible categorization of long-tail vs normal objects, the normal objects may include on the order of 90% of all labeled objects in the data set, while the long-tail objects may include on the order of 5-10% of labeled objects. Thus, for example, the normal objects may be an order of magnitude (or more) more likely to be identified than the long-tail objects. It should be noted that the specific objects to be tracked are arbitrary, and other domain-specific environments 104 are contemplated.

Given the surrounding multi-view 2D images 106, the dual-branch mixed 2D semantic segmentation solution includes two branches: the open-set detection branch 110 and the closed-set detection branch 112. The open-set detection branch 110 is designed for the long-tail rare object labeling, while the closed-set detection branch 112 is designed for the more common classes labeling. It may be relatively easier to train a segmentation network on objects that are common within the domain-specific environment 104, e.g., due to the availability of labeled training data for those object classes, but it may be more difficult to achieve good results for long-tail rare object labeling that rarely or that never appear in labeled training data.

In the open-set detection branch 110, the open-set object detection 122 may be performed using a vision-language VFM to obtain the 2D bounding boxes of long-tail objects. In an example, the VFM may be Grounding DINO. DINO refers to self-DIstillation with NO labels and is a vision transformer (ViT) that learns class-specific features. The results may be used for unsupervised segmentation masks that visibly correlate with the shape of semantic objects in images. Grounding DINO is an open-set object detector, and is implemented by using the Transformer-based detector DINO with grounded pre-training, which can detect arbitrary objects with human inputs such as category names or expressions. The open-set object detection 122 in Grounding DINO is trained using existing bounding box annotations and aims at detecting arbitrary classes with the help of language generalization. Grounding DINO may accordingly be used to perform 2D long-tail object detection of the multi-view 2D images 106, and generate 2D bounding boxes and textual results indicative of the detected objects, e.g., "a red excavator".

Using the 2D bounding boxes as prompts, the image segmentation VFM 124 may be used to perform a 2D pixel-level labeling of detected long-tail objects in the multi-view 2D images 106. In an example, the SAM foundation model may be used as the model for image segmentation. SAM uses an image encoder to generate an image embedding, and a prompt encoder that may receive sparse prompts such as boxes or dense prompts such as masks. SAM then employes a mask decoder to map the image embedding, prompt embeddings, and an output token (e.g., a class) to a mask. The output token is provided to a dynamic linear classifier, which computes the mask foreground probability at each image location. The highest ranked mask is then provided as the output.

Turning to the closed-set detection branch 112, pixel-level labels of regular classes present in the multi-view 2D images 106 may be extracted through a transformer-style semantic segmentation network trained on a large quantity of captured data. This may provide good results for the closed set of object classes that are relatively common in the training data used to train the segmentation model. However, when applied to new real-world data, the segmentation performance tends to deteriorate, especially around the object edges, due to domain discrepancies between the training data and the multi-view 2D images 106. To address this, an image segmentation VFM 128, such as SAM again, may be used to refine the initial semantic masks produced by the close-set semantic segmentation network, resulting in more precise, fine-grained semantic masks. (An example of this is shown the second row in FIG. 2.) Using this approach, 2D labels that are inaccurately predicted by the close-set semantic segmentation network at the object edges can achieve substantial correction due to the use of the image segmentation VFM 128.

Thus, the dual-branch technique uses open-set object detection 122 combined with the image segmentation VFM 124 to obtain pixel-level 2D labels for the long-tail classes. For the normal classes, the system 100 leverages closed-set object detection 126 also in conjunction with a image segmentation VFM 128 to achieve the desired pixel-level 2D labels. Collectively, the labeling provided by the open-set detection branch 110 and the closed-set detection branch 112 is be referred to herein as the 2D semantic knowledge 130.

Figure 2:
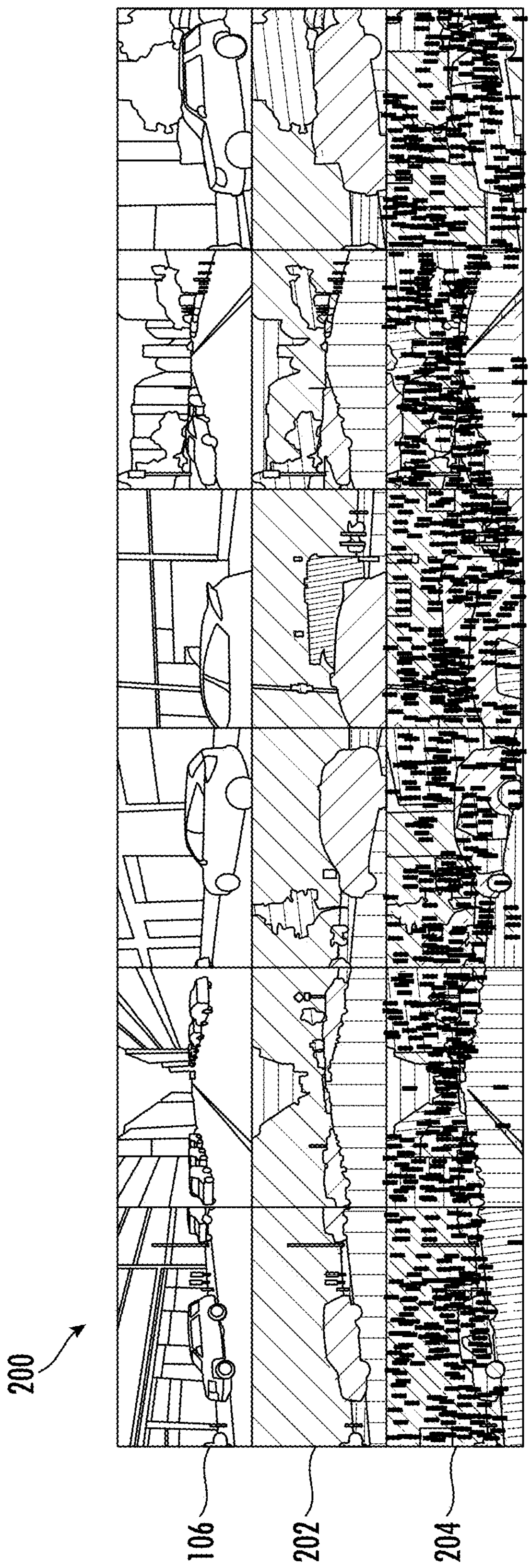
FIG. 2 illustrates an example 2D semantic segmentation using a 2D visual foundation model.
Figure 3:
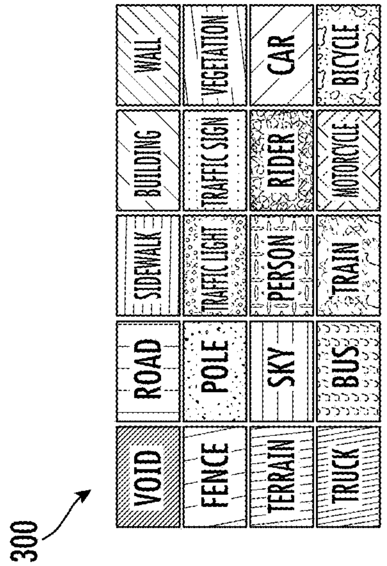
FIG. 3 illustrates an example color map of sematic labels for the 2D semantic segmentation of FIG. 2.

FIG. 2 illustrates an example 200 of operation of the dual-branch technique on a sequence of multi-view 2D images 106. As shown, the multi-view 2D images 106 are a sequence of views taken from a vehicle of its surroundings. The multi-view 2D images 106 are shown in the top row of FIG. 2. The middle row of FIG. 2 shows the closed-set semantic segmentation 202 of the 2D semantic knowledge 130. The bottom row of FIG. 2 shows the open-set semantic segmentation 204 of the 2D semantic knowledge 130, including masks and class labeling. In addition, a key 300 for the semantic segmentation shown in FIG. 2 is provided in FIG. 3.

Referring back to FIG. 1 and turning to the 3D spatial-temporal geometry prompt generation 114, a primary limitation of 2D image segmentation VFMs 124, 128 (such as the SAM and SEEM mentioned above) is their lack of 3D geometric information. To address this, the system 100 may generate the 3D spatial-temporal prompts 138 from the 3D LiDAR points 108, which may then be used to help apply the 2D semantic knowledge 130 harnessed by the image segmentation VFMs 124, 128 to the 3D LiDAR points 108.

Figure 4A:
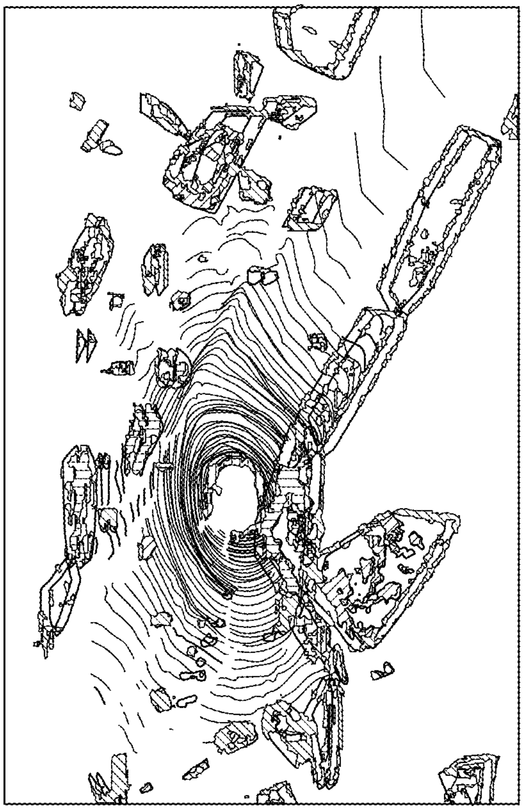
FIG. 4A illustrates an example of 3D adaptive Euclidean clustering of the 3D LiDAR points.

FIG. 4A illustrates an example 400A of 3D adaptive Euclidean clustering of the 3D LiDAR points 108. Here, the adaptive clustering 134 of the 3D spatial-temporal geometry prompt generation 114 may receive the 3D LiDAR points 108. As shown, the adaptive clustering 134 may employ an adaptive Euclidean clustering to extract class-agnostic grouping from the 3D LiDAR points 108. In this approach the threshold for Euclidean clustering is adaptively adjusted based on an actual scan range observed in the LiDAR measurements. This scan range is determined by the vertical distance between two consecutive channels of the LiDAR sensor 102 that captured the 3D LiDAR points 108. Additionally, fast point feature histograms (FPFH) descriptors may be captured for each of these clusters. FPFH are 3D feature descriptors that encode a point's k-neighborhood geometrical properties by generalizing the mean curvature around the point using a multi-dimensional histogram of values. The FPFH is a fast approach to computation of the point feature histogram features from the 3D LiDAR points 108. It should be noted that this is only an example and other approaches to determining point feature histograms may be used.

Figure 4B:
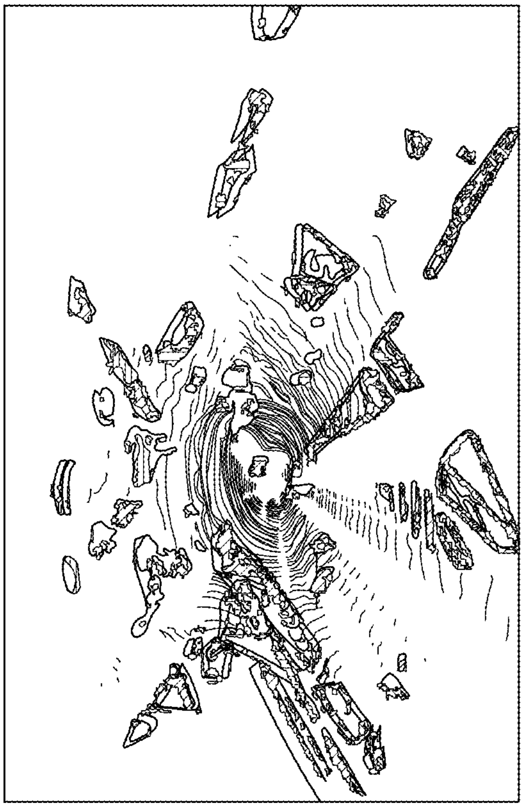
FIG. 4B illustrates an example of tracking of the 3D LiDAR points.

FIG. 4B illustrates an example 400B of tracking of the 3D LiDAR points 108. Given the point cloud cluster and its corresponding FPFH descriptor, the 3D tracking 136 of the 3D spatial-temporal geometry prompt generation 114 uses an Extended Kalman Filter (EKF) to track each cluster in real-time throughout the sequence of LiDAR measurements of the 3D LiDAR points 108. From this, the 3D tracking 136 estimates the velocity and yaw angle of each cluster. As a result, the 3D tracking 136 derives 3D spatial-temporal geometric cues from the 3D data using LiDAR clustering and tracking. These 3D geometric cues then serve as the 3D spatial-temporal prompts 138 to access the 2D semantic information generated by the 2D VFMs.

Referring back to FIG. 1, and turning to the 2D-3D label retrieval 116, using both the 2D semantic knowledge 130 and the 3D spatial-temporal prompts 138, the 2D-3D label retrieval 116 maps the 2D labels from the multi-view 2D images 106 to their corresponding 3D point cloud clusters (e.g., such as shown in FIGS. 4A-4B). In an example, each point within the same cluster may be assigned consistent semantic labels using a maximum voting method.

Figure 5:
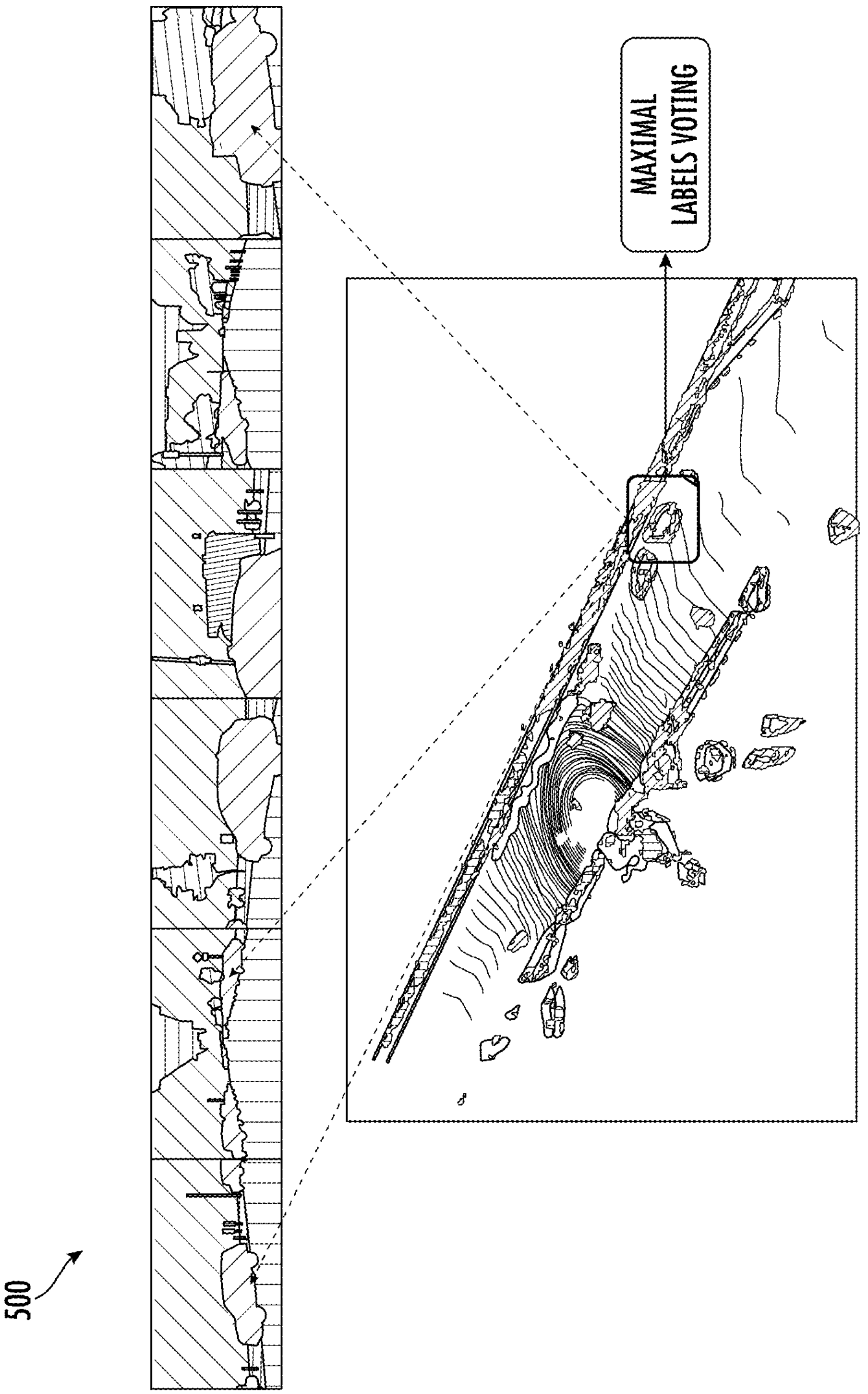
FIG. 5 illustrates an example sketch of 3D label retrieval from multi-view 2D labels.

An example of this is depicted in FIG. 5. The 2D-3D correspondences may be obtained through sensor calibration. By labeling the 3D points of the 3D LiDAR points 108 at the group/cluster level instead of the individual point level, errors introduced by potential inaccuracies in sensor calibration are significantly reduced. In the end, the system 100 achieves a dense 3D semantic labeling for each sequence of LiDAR measurements. This result is referred to herein as the labeled 3D LiDAR points 118.

Figure 6:
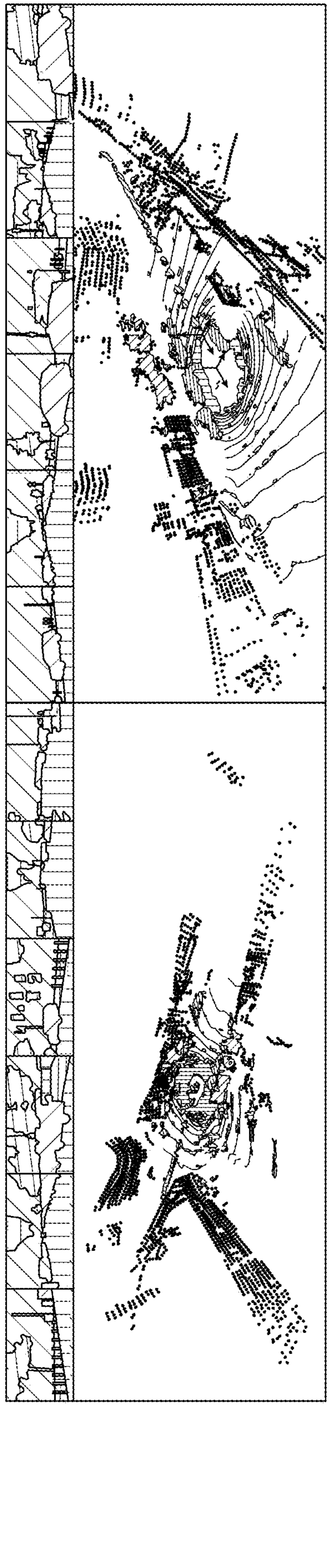
FIG. 6 illustrates an example of qualitative results of 2D and 3D auto-labeling.

The nuScenes dataset is a widely recognized self-driving public dataset. Results of this approach may be discussed in terms of that dataset. Qualitative and quantitative results are respectively presented in FIG. 6. As evident from FIG. 6, the system 100 produces distinctly clear and sharp 2D/3D semantic labels for both multi-view 2D images 106 and from 3D LiDAR points 108.

Table 1 further demonstrates that the system 100 delivers highly accurate labeling performance. The system 100 not only boasts high auto-labeling accuracy but also demonstrates strong generalization and scalability when applied to new real-world data.

TABLE 1

Quantitative results of 3D semantic segmentation

| Class | Road | Building | Fence | Traffic Light | Vegetation | Person | Truck |
|---|---|---|---|---|---|---|---|
| IoU | 90.8 | 94.5 | 87.3 | 96.08 | 82.5 | 96.4 | 97.4 |

| Class | Side-walk | Wall | Pole | Traffic Sign | Bus | Car | Bicycle |
|---|---|---|---|---|---|---|---|
| IoU | 73.9 | 98.6 | 94.4 | 97.1 | 93.7 | 94.8 | 61 |

Figure 7:
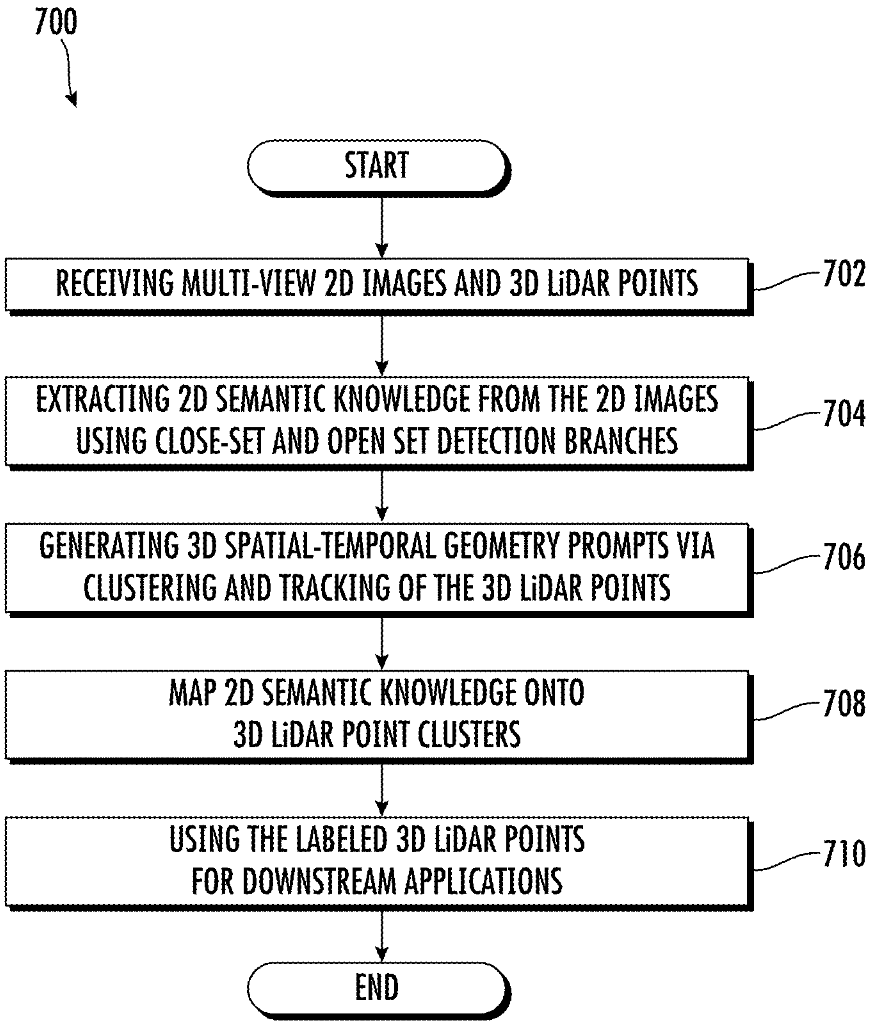
FIG. 7 illustrates an example process for the zero-shot and open-vocabulary 3D auto-labeling approach.

FIG. 7 illustrates an example process 700 for performing the zero-shot and open-vocabulary 3D auto-labeling approach. In an example, the process 700 may be performed by the system 100 discussed in detail with respect to FIGS. 1-6.

At operation 702, multi-view 2D images 106 and corresponding 3D LiDAR points 108 of the environment 104 are received by the system 100. In an example, the system 100 receives, from sensors 102 in an environment 104, a sequence of multi-view 2D images 106 and 3D LiDAR points 108 as inputs. For instance, 2D camera sensors 102 may be used to capture the multi-view 2D images and using 3D LiDAR sensors 102 to capture the 3D LiDAR points 108. In a specific non-limiting example, the 2D camera sensors 102 and the 3D LiDAR sensors 102 are integrated into a vehicle, and the multi-view 2D images 106 are captured 2D images of the surroundings of the vehicle from different angles, and the 3D LiDAR sensors 102 capture a point cloud of 3D LiDAR points 108 surrounding the vehicle.

At operation 704, the system 100 extracts 2D semantic knowledge 130 from the multi-view 2D images 105 using close-set and open-set detection branches 110. In an example, the objects requiring labeling in the multi-view 2D images 106 are categorized into long-tail objects and normal objects, the long-tail objects being relatively more rarely labeled as compared to the normal objects that are relatively more commonly labeled. In the open-set detection branch 110, a 2D vision-language VFM may be used to obtain 2D bounding boxes of long-tail objects, where using a 2D image segmentation VFM 124, the 2D bounding boxes are used as prompts to determine pixel-level labels of the detected long-tail objects. Additionally, in the closed-set detection branch 112, pixel-level labels of the normal classes are extracted using a transformer-style semantic segmentation network trained for identifying the normal classes in captured multi-view 2D images 106, where the image segmentation VFM 128 is similarly used to determine pixel-level labels of the detected normal objects.

At operation 706, the system 100 uses the 3D spatial-temporal geometry prompt generation 114 to generate 3D spatial-temporal prompts 138 via the adaptive clustering 134 and 3D tracking 136 of the 3D LiDAR points 108. In an example, the adaptive clustering 134 uses adaptive Euclidean clustering to extract class-agnostic groups from the 3D LiDAR points 108. In some examples, this includes adaptively adjusting a threshold for the Euclidean clustering based on scan range observed in LiDAR measurements from the LiDAR sensor 102 measuring the 3D LiDAR points 108, the scan range being determined by a vertical distance between consecutive channels of the LiDAR sensor 102. In an example, the 3D tracking 136 includes capturing FPFH descriptors for each of the plurality of clusters, using an EKF to track each of the plurality of clusters throughout the sequence of LiDAR measurements, and tracking each of the plurality of clusters throughout a sequence of LiDAR measurements to estimate velocity and yaw angle of each of the plurality of clusters.

At operation 708, the 2D-3D label retrieval 116 of the system 100 uses the 3D spatial-temporal geometry prompts and the 2D semantic knowledge 130 to map the 2D labels of the 2D semantic knowledge 130 to the plurality of clusters of the 3D LiDAR points 108, thereby producing labeled 3D LiDAR points 118 defining a 3D semantic segmentation. In an example, the 2D-3D label retrieval 116 may include deriving 3D spatial-temporal geometric cues from the 3D LiDAR points 108 using the tracking of the plurality of clusters, and using the 3D spatial-temporal geometric cues as the 3D spatial-temporal prompts 138 to query the 2D semantic knowledge 130 generated by the image segmentation VFMs 124, 128 for labeling the tracked plurality of clusters.

At operation 710, the system 100 performs one or more downstream applications 120 using the labeled 3D LiDAR points 118. In an example, the labeled 3D LiDAR points 118 may be used as ground truth in the training and/or validating of machine learning models to identify classes in the 3D LiDAR points 108. Additional examples of downstream applications 120 are discussed with respect to FIGS. 8-9.

Thus, by using the dual-branch close-open set including the open-set detection branch 110 and the closed-set detection branch 112 for 2D semantic segmentation via 2D VFMs, the system 100 extracts both close-set and open-set 2D semantic information from surrounding multi-view images using VFMs. Using the 3D spatial-temporal geometry prompt generation 114 to generate 3D spatial-temporal prompts 138 generated via the adaptive clustering 134 and the 3D tracking 136 of the 3D LiDAR points 108, the system 100 utilizes the 2D semantic knowledge 130 created by the dual-branch 2D semantic segmentation to feed into the 2D-3D label retrieval 116. Using the 3D spatial-temporal prompts 138, the system 100 taps into the 2D semantic knowledge 130 to label the 3D LiDAR points 108 into labeled 3D LiDAR points 118 at the cluster group level. Notably, the system 100 is a zero-shot solution, eliminating the need for specific training.

Figure 8:
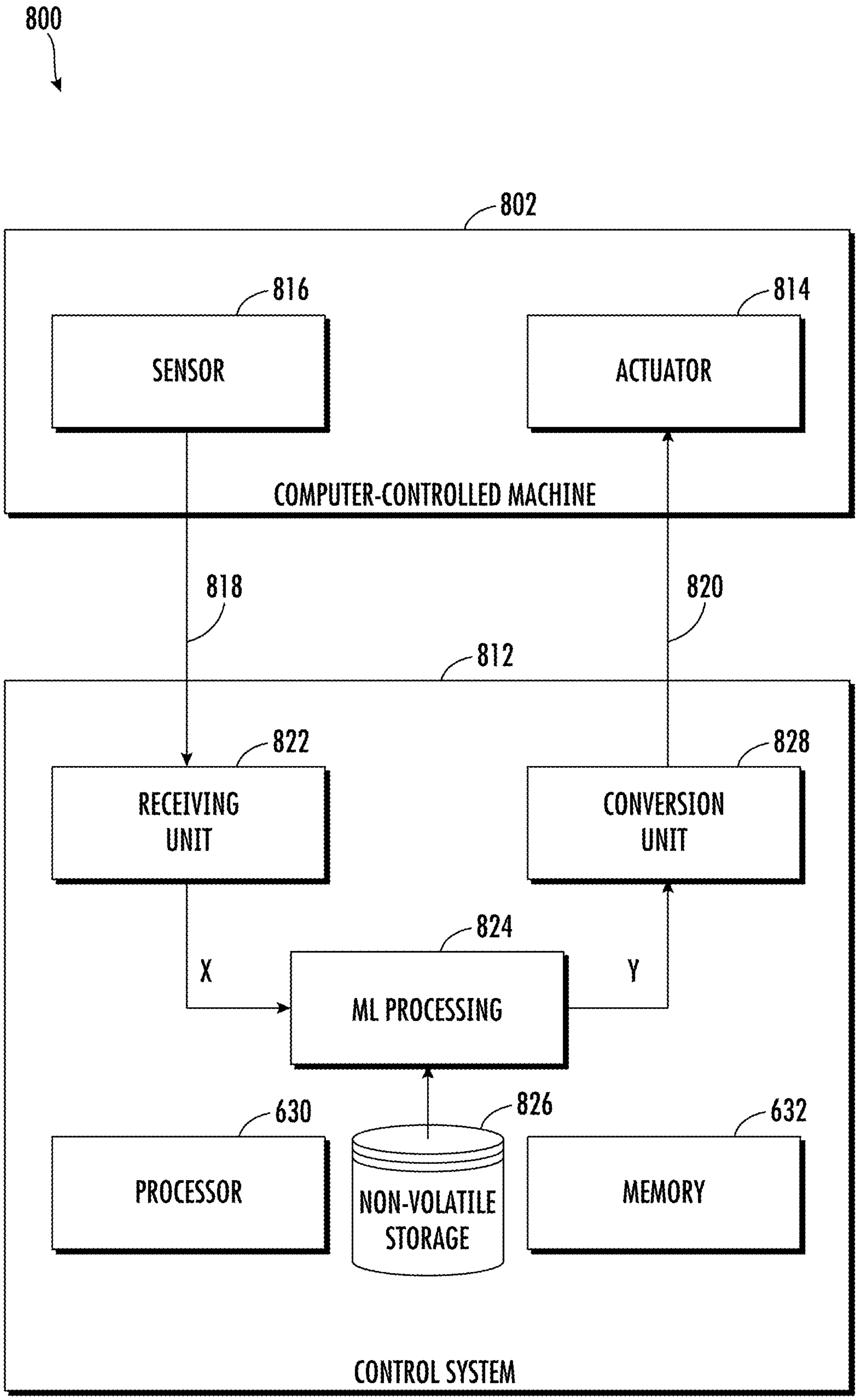
FIG. 8 illustrates a schematic diagram of an interaction between a computer-controlled machine and a control system.

FIG. 8 illustrates a schematic diagram of an interaction between a computer-controlled machine 802 and a control system 812. The computer-controlled machine 800 may implement aspects of the training and use of Schrodinger-Bridge-based generative models. Referring to FIG. 8, and with reference to FIGS. 1-7, the approaches discussed herein may be performed in the context of such a computer-controlled machine 802 and control system 812. The computer-controlled machine 802 includes actuator 814 and sensor 816. Actuator 814 may include one or more actuators and sensor 816 may include one or more sensors. Sensor 816 is configured to sense a condition of computer-controlled machine 802. Sensor 816 may be configured to encode the sensed condition into sensor signals 818 and to transmit sensor signals 818 to control system 812. Non-limiting examples of sensor 816 include video, radar, LiDAR, ultrasonic and motion sensors. In one embodiment, sensor 816 is an optical sensor configured to sense optical images of an environment 104 proximate to computer-controlled machine 802.

The control system 812 is configured to receive the sensor signals 818 from the computer-controlled machine 802. The control system 812 may be further configured to compute actuator control commands 820 depending on the sensor signals and to transmit actuator control commands 820 to the actuator 814 of computer-controlled machine 802.

As shown in FIG. 8, control system 812 includes receiving unit 822. Receiving unit 822 may be configured to receive sensor signals 818 from sensor 816 and to transform sensor signals 818 into input signals X. In an alternative embodiment, sensor signals 818 are received directly as input signals X without receiving unit 822. Each input signal x may be a portion of each sensor signal 618. Receiving unit 822 may be configured to process each sensor signal 618 to product each input signal x. Input signal x may include data corresponding to an image recorded by sensor 816.

Control system 812 includes machine learning (ML) processing 824. ML processing 824 may be configured to learn, classify, infer, generate, etc. using one or more models such as those described in detail above. In an example, ML processing 824 is configured to determine output signals Y from input signals X. Each output signal y includes information that assigns one or more labels to each input signal X. ML processing 824 may transmit output signals Y to conversion unit 828. Conversion unit 828 is configured to convert output signals Y into actuator control commands 820. Control system 812 is configured to transmit actuator control commands 820 to actuator 814, which is configured to actuate computer-controlled machine 802 in response to actuator control commands 820. In another embodiment, actuator 814 is configured to actuate computer-controlled machine 802 based directly on output signals Y.

Upon receipt of actuator control commands 820 by actuator 814, actuator 814 is configured to execute an action corresponding to the related actuator control command 820. Actuator 814 may include a control logic configured to transform actuator control commands 820 into a second actuator control command, which is utilized to control actuator 814. In one or more embodiments, actuator control commands 820 may be utilized to control a display instead of or in addition to an actuator.

In another embodiment, control system 812 includes sensor 816 instead of or in addition to computer-controlled machine 802 including sensor 816. Control system 812 may also include actuator 814 instead of or in addition to computer-controlled machine 802 including actuator 814.

As shown in FIG. 8, control system 812 also includes processor 830 and memory 832. Processor 830 may include one or more processors. Memory 832 may include one or more memory devices. The classifier 824 (e.g., ML algorithms) of one or more embodiments may be implemented by control system 812, which includes non-volatile storage 826, processor 830 and memory 832.

Non-volatile storage 826 may include one or more persistent data storage devices such as a hard drive, optical drive, tape drive, non-volatile solid-state device, cloud storage or any other device capable of persistently storing information. Processor 830 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 832. Memory 832 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 830 may be configured to read into memory 832 and execute computer-executable instructions residing in non-volatile storage 826 and embodying one or more ML algorithms and/or methodologies of one or more embodiments. Non-volatile storage 826 may include one or more operating systems and applications. Non-volatile storage 826 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

Upon execution by processor 830, the computer-executable instructions of non-volatile storage 826 may cause control system 812 to implement one or more of the ML algorithms and/or methodologies as disclosed herein. Non-volatile storage 826 may also include ML data (including data parameters) supporting the functions, features, and processes of the one or more embodiments described herein.

Figure 9:
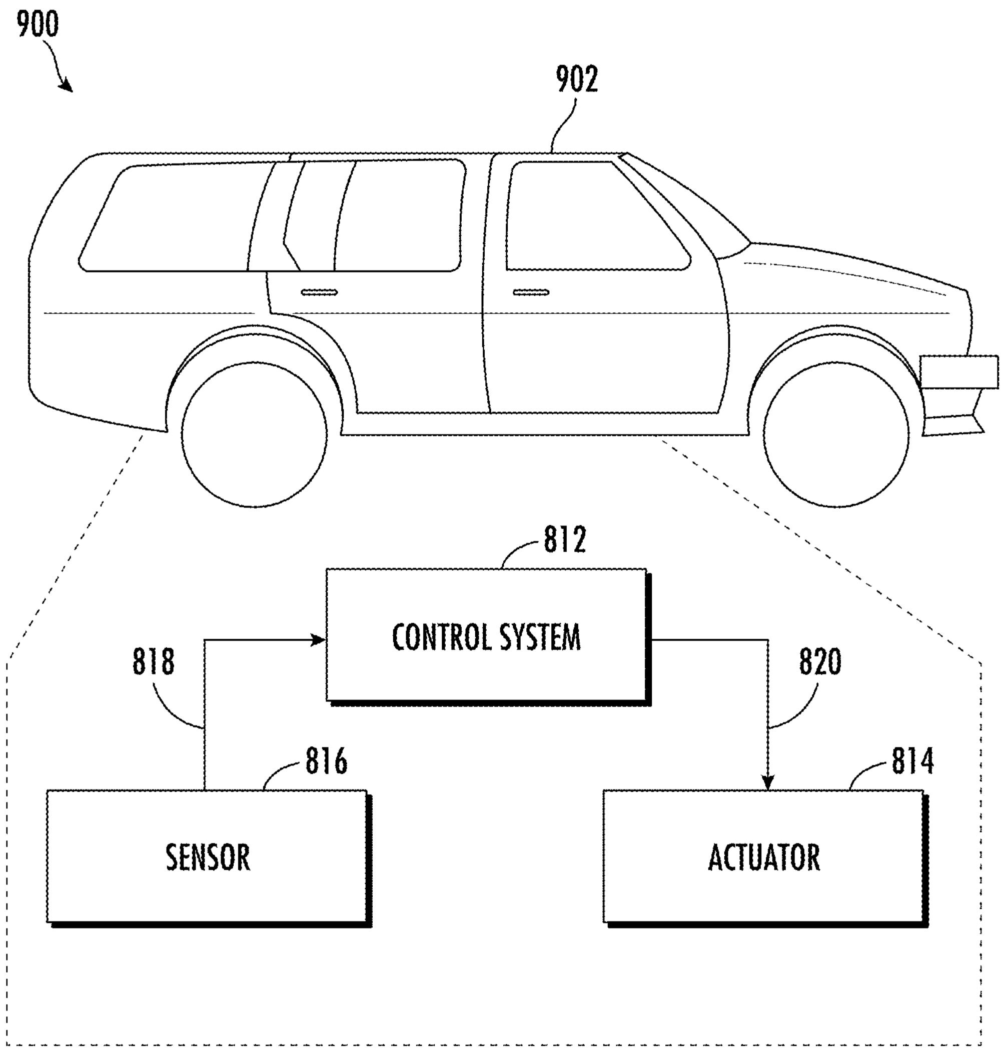
FIG. 9 illustrates a schematic diagram of the control system configured to control a vehicle.

FIG. 9 illustrates a schematic diagram 900 of the control system 812 configured to control a vehicle 902, which may be an at least partially autonomous vehicle or an at least partially autonomous robot. As shown in FIG. 9, the vehicle 902 includes an actuator 814 and a sensor 816. The sensor 816 may include one or more video sensors, radar sensors, ultrasonic sensors, LiDAR sensors, and/or position sensors (e.g., global navigation satellite system (GNSS)). One or more of the one or more specific sensors may be integrated into the vehicle 902. Alternatively, or in addition to one or more specific sensors identified above, the sensors 816 may include a software module configured to, upon execution, determine a state of the actuator 814. One non-limiting example of a software module includes a weather information software module configured to determine a present or future state of the weather proximate vehicle 902 or other location.

The ML processing 824 of the control system 812 of the vehicle 902 may be configured to detect objects in the vicinity of the vehicle 902 dependent on input signals X. In such an embodiment, output signal Y may include information characterizing the vicinity of objects to the vehicle 902. An actuator control command 820 may be determined in accordance with this information. The actuator control command 820 may be used to avoid collisions with the detected objects.

In embodiments where the vehicle 902 is an at least partially autonomous vehicle, the actuator 814 may be embodied in a brake, a propulsion system, an engine, a drivetrain, or a steering of the vehicle 902. The actuator control commands 820 may be determined such that the actuator 814 is controlled such that the vehicle 902 avoids collisions with detected objects. Detected objects may also be classified according to what the classifier 824 deems them most likely to be, such as pedestrians or trees. The actuator control commands 820 may be determined depending on the classification.

In other embodiments where the vehicle 902 is an at least partially autonomous robot, the vehicle 902 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 820 may be determined such that a propulsion unit, steering unit and/or brake unit of the mobile robot may be controlled such that the mobile robot may avoid collisions with identified objects.

In another embodiment, the vehicle 902 is an at least partially autonomous robot in the form of a gardening robot. In such embodiment, the vehicle 902 may use an optical sensor as sensor 816 to determine a state of plants in an environment 104 proximate the vehicle 902. The actuator 814 may be a nozzle configured to spray chemicals. Depending on an identified species and/or an identified state of the plants, the actuator control command 820 may be determined to cause the actuator 814 to spray the plants with a suitable quantity of suitable chemicals.

The vehicle 902 may be an at least partially autonomous robot in the form of a domestic appliance. Non-limiting examples of domestic appliances include a washing machine, a stove, an oven, a microwave, or a dishwasher. In such a vehicle 02, the sensor 916 may be an optical sensor configured to detect a state of an object which is to undergo processing by the household appliance.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for zero-shot open-vocabulary 3D auto-labeling using visual foundation models (VFMs), comprising:

receiving multi-view 2D images of an environment and corresponding 3D LiDAR points of the environment;

extracting 2D semantic knowledge from the multi-view 2D images in close-set and open-set detection branches;

generating 3D spatial-temporal prompts via clustering and tracking of the 3D LiDAR points;

using the 3D spatial-temporal prompts and the 2D semantic knowledge for mapping the 2D semantic knowledge to a plurality of clusters of the 3D LiDAR points, thereby producing labeled 3D LiDAR points defining a 3D semantic segmentation of the 3D LiDAR points; and performing one or more downstream applications using the labeled 3D LiDAR points.

2. The method of claim 1, further comprising:

in the open-set detection branch, using a 2D vision-language VFM to obtain 2D bounding boxes of long-tail objects; and using a 2D image segmentation model, receiving the 2D bounding boxes as prompts to determine pixel-level labels of the detected long-tail objects.

3. The method of claim 2, further comprising:

in the close-set detection branch, extracting pixel-level labels of normal classes using a transformer-style semantic segmentation network trained for identifying the normal classes in captured data; and using the segmentation model to determine pixel-level labels of the detected normal objects.

4. The method of claim 1, further comprising:

categorizing objects requiring labeling in the multi-view 2D images into long-tail objects and normal objects, the long-tail objects being relatively more rarely labeled as compared to the normal objects that are relatively more commonly labeled.

5. The method of claim 1, further comprising:

in generating the 3D spatial-temporal prompts, using an adaptive Euclidean clustering to extract class-agnostic groups from the 3D LiDAR points.

6. The method of claim 5, further comprising:

in generating the 3D spatial-temporal prompts, adaptively adjusting a threshold for the Euclidean clustering based on scan range observed in LiDAR measurements from a LiDAR sensor measuring the 3D LiDAR points, the scan range being determined by a vertical distance between consecutive channels of the LiDAR sensor.

7. The method of claim 1, further comprising, in generating the 3D spatial-temporal prompts:

capturing Fast Point Feature Histogram (FPFH) descriptors for each of the plurality of clusters;

using an Extended Kalman Filter (EKF) to track each of the plurality of clusters throughout the sequence of LiDAR measurements; and tracking each of the plurality of clusters throughout a sequence of LiDAR measurements to estimate velocity and yaw angle of each of the plurality of clusters.

8. The method of claim 7, further comprising:

deriving 3D spatial-temporal geometric cues from the 3D LiDAR points using the tracking of the plurality of clusters; and using the 3D spatial-temporal geometric cues as the 3D spatial-temporal prompts to query the 2D semantic knowledge for labeling the tracked plurality of clusters.

9. The method of claim 1, wherein the one or more downstream applications include annotating sensor data received from an autonomous vehicle for training and validating a machine learning model.

10. The method of claim 1, further comprising using 2D camera sensors to capture the multi-view 2D images and using 3D LiDAR sensors to capture the 3D LiDAR points.

11. The method of claim 10, wherein the 2D camera sensors and the 3D LiDAR sensors are integrated into a vehicle, and the multi-view 2D images capture 2D images of the surroundings of the vehicle from different angles, and the 3D LiDAR sensors capture a 3D point cloud surrounding the vehicle.

12. A system for zero-shot open-vocabulary 3D autolabeling using visual foundation models (VFMs), comprising:

2D camera sensors configured to capture multi-view 2D images;

3D LiDAR sensors configured to capture 3D LiDAR points, the 3D LiDAR points corresponding to the multi-view 2D images; and one or more computing devices configured to:

receive the multi-view 2D images of an environment and the 3D LiDAR points of the environment, extract 2D semantic knowledge from the multi-view 2D images in close-set and open-set detection branches, generate 3D spatial-temporal prompts via clustering and tracking of the 3D LiDAR points, use the 3D spatial-temporal prompts and the 2D semantic knowledge for mapping the 2D semantic knowledge to a plurality of clusters of the 3D LiDAR points, thereby producing labeled 3D LiDAR points defining a 3D semantic segmentation of the 3D LiDAR points, and perform one or more downstream applications using the labeled 3D LiDAR points.

13. The system of claim 12, wherein the one or more computing devices are further configured to:

in the open-set detection branch, using a 2D vision-language VFM to obtain 2D bounding boxes of long-tail objects; and using a 2D image segmentation model, receiving the 2D bounding boxes as prompts to determine pixel-level labels of the detected long-tail objects.

14. The system of claim 13, wherein the one or more computing devices are further configured to:

in the close-set detection branch, extracting pixel-level labels of normal classes using a transformer-style semantic segmentation network trained for identifying the normal classes in captured data; and using the segmentation model to determine pixel-level labels of the detected normal objects.

15. The system of claim 12, wherein the one or more computing devices are further configured to:

categorizing objects requiring labeling in the multi-view 2D images into long-tail objects and normal objects, the long-tail objects being relatively more rarely labeled as compared to the normal objects that are relatively more commonly labeled.

16. The system of claim 12, wherein the one or more computing devices are further configured to:

in generating the 3D spatial-temporal prompts, using an adaptive Euclidean clustering to extract class-agnostic groups from the 3D LiDAR points.

17. The system of claim 16, wherein the one or more computing devices are further configured to:

in generating the 3D spatial-temporal prompts, adaptively adjust a threshold for the Euclidean clustering based on scan range observed in LiDAR measurements from a LiDAR sensor measuring the 3D LiDAR points, the scan range being determined by a vertical distance between consecutive channels of the LiDAR sensor.

18. The system of claim 12, wherein the one or more computing devices are further configured to:

capture Fast Point Feature Histogram (FPFH) descriptors for each of the plurality of clusters;

use an Extended Kalman Filter (EKF) to track each of the plurality of clusters throughout the sequence of LiDAR measurements; and track each of the plurality of clusters throughout a sequence of LiDAR measurements to estimate velocity and yaw angle of each of the plurality of clusters.

19. The system of claim 18, wherein the one or more computing devices are further configured to:

derive 3D spatial-temporal geometric cues from the 3D LiDAR points using the tracking of the plurality of clusters; and use the 3D spatial-temporal geometric cues as the 3D spatial-temporal prompts to query the 2D semantic knowledge for labeling the tracked plurality of clusters.

20. The system of claim 12, wherein the one or more downstream applications include to annotate sensor data received from an autonomous vehicle for training and validating a machine learning model.

21. The system of claim 12, wherein the 2D camera sensors and the 3D LiDAR sensors are integrated into a vehicle, and the multi-view 2D images capture 2D images of the surroundings of the vehicle from different angles, and the 3D LiDAR sensors capture a 3D point cloud surrounding the vehicle.

22. A non-transitory computer-readable medium comprising instructions for zero-shot open-vocabulary 3D auto-labeling using visual foundation models (VFMs) that, when executed by one or more computing devices, cause the one or more computing devices to perform operations including to:

receive multi-view 2D images of an environment from 2D camera sensors;

receive 3D LiDAR points of the environment from 3D LiDAR sensors;

extract 2D semantic knowledge from the multi-view 2D images in close-set and open-set detection branches, including:

in the open-set detection branch, using a 2D vision-language VFM to obtain 2D bounding boxes of long-tail objects and using a 2D image segmentation model, receiving the 2D bounding boxes as prompts to determine pixel-level labels of the detected long-tail objects, and in the close-set detection branch, extracting pixel-level labels of normal classes using a transformer-style semantic segmentation network trained for identifying the normal classes in captured data, and using the segmentation model to determine pixel-level labels of the detected normal objects;

generate 3D spatial-temporal prompts via clustering and tracking of the 3D LiDAR points;

use the 3D spatial-temporal prompts and the 2D semantic knowledge for mapping the 2D semantic knowledge to a plurality of clusters of the 3D LiDAR points, thereby producing labeled 3D LiDAR points defining a 3D semantic segmentation of the 3D LiDAR points; and perform one or more downstream applications using the labeled 3D LiDAR points.

* * * * *